J. A. OLBON.
AUTOMOBILE LOCK.
APPLICATION FILED JULY 29, 1918.
1,318,103. Patented Oct. 7, 1919.
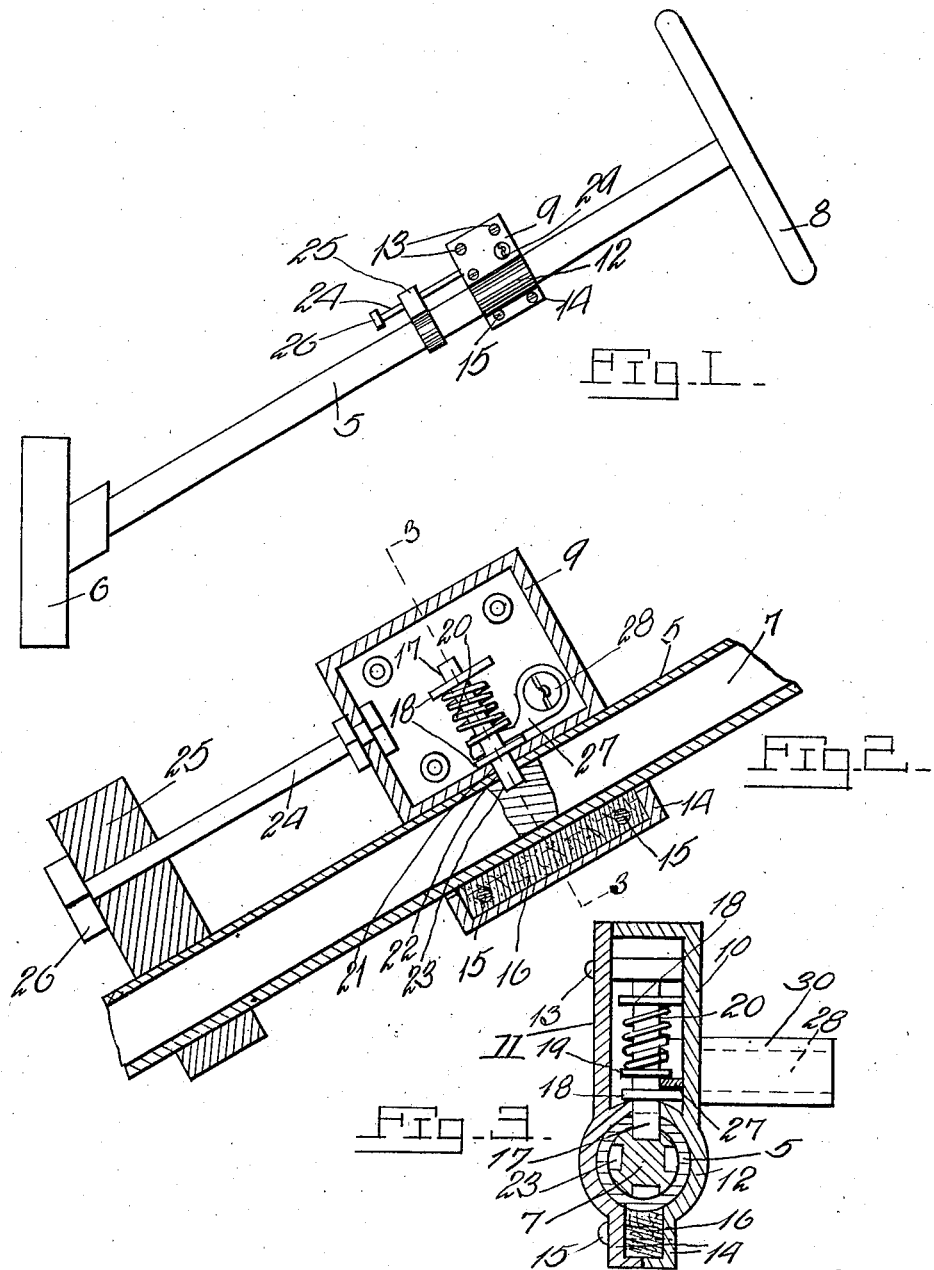

UNITED STATES PATENT OFFICE.

JOHN A. OLBON, OF PATERSON, NEW JERSEY.

AUTOMOBILE-LOCK.

1,318,103.　　　　Specification of Letters Patent.　　Patented Oct. 7, 1919.

Application filed July 29, 1918. Serial No. 247,285.

*To all whom it may concern:*

Be it known that I, JOHN A. OLBON, a citizen of the United States, residing at Paterson, in the county of Passaic and State of New Jersey, have invented certain new and useful Improvements in Automobile-Locks, of which the following is a specification.

My invention relates to improvements in means for locking the steering gear of an automobile or the like, against operation, and has particular reference to a device adapted to lock the steering column or rod with the relatively stationary tubular housing or sleeve, within which it is mounted.

An important object of the invention is to provide a device of the above mentioned character, which is of simplified construction, and adapted to be applied to and used with the steering gear of an automobile, without materially altering the construction thereof.

Other objects and advantages of the invention will be apparent during the course of the following description.

In the accompanying drawings forming a part of this specification and in which like numerals are employed to designate like parts throughout the same, Figure 1 is a side elevation of apparatus embodying my invention, Fig. 2 is an enlarged central vertical longitudinal sectional view through the same, and, Fig. 3 is a transverse sectional view taken on line 3—3 of Fig. 2.

In the drawings, wherein for the purpose of illustration is shown a preferred embodiment of my invention, the numeral 5 designates a relatively stationary tubular housing or sleeve, secured to a support or base 6, as is well known. The tubular housing 5 is inclined and constitutes a portion of the steering gear of an automobile.

Disposed within the tubular housing 5, to turn therein, is a rod or column 7, to the upper or rear end of which is secured the usual steering hand wheel 8.

My improved lock device embodies a casing 9, including a permanent side 10, and a removable side 11. These sides are provided with socket-extensions 12, preferably semi-circular in cross-section, and slidably receiving the tubular housing 5. The side 11 is held to the side 10 by rivets 13.

The socket-extensions 12 are provided upon their outer sides with longitudinal sockets 14, connected by rivets 15. The assembled sockets 14 receive packing 16, which may be of fibrous material, such as felt, rubber, or any yielding material adapted to contact with the tubular housing 5 and prevent the device from rattling.

The numeral 17 designates a reciprocatory bolt, operating through stationary guides 18, fixed to the side 10. The bolt 17 has a ring 19 rigidly secured thereto, and engaging a compressible coil spring 20, serving to urge the bolt downwardly. The bolt 17 operates permanently within an opening 21 formed in the casing 9, and is adapted to enter an opening 22, formed in the tubular housing 5, when said openings are brought into registration, which occurs when the casing 9 is moved to the upper position. The bolt 17 is also adapted to enter a selected recess or notch 23, formed in the rod 7. These recesses are arranged in an annular group.

The casing 9 is adapted to reciprocate upon the housing 5, but cannot turn thereon, as it is rigidly connected with a guide rod 24, operating through an opening in a stationary guide 25, clamped to the housing 5. At its rear end, the guide rod 24 has a head 26 rigidly secured thereto, serving as a stop, for the rearward movement of the rod.

The bolt 17 is raised by a finger 27, arranged beneath and contacting with the ring 19. The finger 27 is rigidly secured to a barrel 28 of a lock, having an opening 29, for the reception of a suitable key. This barrel is mounted to turn within a stationary casing 30, when released, by the insertion of the key. Any suitable form of lock may be employed, such as the tumbler and barrel type.

The operation of the device is as follows:

To lock the rod 7 against turning movement, the casing 9 is shifted to the uppermost position, which is defined by the head 26 contacting with the guide 25. The openings 21 and 22 are now in registration, and the bolt 17 moves into the opening 22. By slightly turning the rod 7, one recess 23 may be brought into registration with the opening 22, and the bolt 17 will at once spring therein, thereby locking the rod 7 against turning movement, and the casing 9 against longitudinal movement.

To release the rod 7 for turning movement, the key is inserted within the opening 29, and the barrel 28 turned, to swing the finger 27 upwardly, thereby withdrawing the bolt 17 from the recess 23 and the opening 22. When this is done, the casing 9 may be moved downwardly, the bolt 9 sliding or riding upon the housing 5. It is thus seen that when the casing 9 is in the lowered position, it is impossible for the bolt to reënter the recesses 23.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. In apparatus of the character described, the combination with a tubular housing having a lateral opening, of a steering post pivoted within the tubular housing and provided with a recess adapted for movement into approximate registration with said opening, a lock casing provided with a socket which is stationary with relation to the lock casing and slidable upon the tubular housing, said socket remaining permanently closed during the operation of the apparatus to lock and release the steering post, a movable bolt arranged within the lock casing, a spring to move the bolt toward the tubular housing so that its free end is adapted to automatically enter said opening and recess when they are in approximate registration, the free end of the bolt being adapted to slidably engage the outer surface of the tubular housing when the lock casing is moved in one direction with relation to the tubular housing, and a key operated element carried by the lock casing and adapted to move the bolt in opposition to the spring.

2. In apparatus of the character described, the combination with a tubular housing having a lateral opening, of a steering post pivoted within the tubular housing and provided with a recess adapted for movement into approximate registration with said opening, a lock casing provided with a socket which is stationary with relation to the lock casing and arranged upon the tubular housing to move longitudinally thereof, said socket remaining permanently closed during the operation of the apparatus to lock and release the steering post, a movable bolt arranged within the lock casing, a spring to move the bolt toward the tubular housing so that its free end is adapted to automatically enter said opening and recess when they are in approximate registration, the free end of the bolt being adapted to slidably engage the outer surface of the tubular housing when the lock casing is moved longitudinally in one direction with relation to the tubular housing, a key operated element carried by the lock casing and adapted to move the bolt in opposition to the spring, a longitudinally extending rod connected with the lock casing and provided at one end with a stop element, and a member fixed to the tubular housing beneath the lock casing and thereby serving to limit the downward movement of the same, said member having an opening to receive the rod which thereby serves as a guide to prevent the turning movement of the lock casing, the stop of the rod serving to limit the upward movement of the lock casing.

3. In apparatus of the character described, comprising a relatively stationary tubular housing having a lateral opening, a steering column pivoted within the housing and provided with a recess, a casing section provided at a point spaced from the opposite ends thereof, with a substantially semi-circular socket member and a pocket arranged upon one side of the socket member, a coacting casing section provided at a point spaced from the opposite ends thereof with a substantially semi-circular socket member coacting with the first named socket member for slidably receiving the stationary housing, the second named casing section having a pocket arranged outwardly of the socket member, a filling of elastic material arranged within the pockets to contact with the stationary housing, a spring pressed bolt arranged within the casing sections for movement into and out of the opening and recess, and means to move the bolt outwardly.

In testimony whereof I affix my signature.

JOHN A. OLBON.